United States Patent [19]

Weingartner

[11] Patent Number: 4,640,437

[45] Date of Patent: Feb. 3, 1987

[54] INSULATED CONTAINER AND INSULATING ELEMENT THEREFOR

[75] Inventor: Rudolf Weingartner, Neuzeug, Austria

[73] Assignee: Kremsmunster, Austria, Austria

[21] Appl. No.: 647,138

[22] Filed: Sep. 4, 1984

[51] Int. Cl.[4] .................... B65D 25/36; B65D 90/06; B65D 90/08

[52] U.S. Cl. ....................... 220/400; 52/249; 52/578; 217/4; 217/88; 217/96; 217/131; 220/450; 220/468; 220/902

[58] Field of Search .......... 220/449, 452, 902, 468, 220/444, 400; 217/96, 88; 122/494; 52/404, 406, 309.9, 539, 536, 595; 403/122, 76

[56] References Cited

U.S. PATENT DOCUMENTS

| | | | |
|---|---|---|---|
| 667,953 | 2/1901 | Ross | 217/96 |
| 1,125,735 | 1/1915 | Schaum et al. | 220/452 |
| 1,868,891 | 7/1932 | Faudi | 403/122 |
| 3,253,845 | 5/1966 | Davies | 403/122 |
| 3,329,174 | 7/1967 | Pfeil | 217/96 X |
| 3,347,048 | 10/1967 | Brown et al. | 52/595 X |
| 3,397,496 | 8/1968 | Sohns | 52/536 X |
| 3,425,657 | 2/1969 | Doyle | 403/122 X |
| 3,468,771 | 9/1969 | Pedlow | 52/309.9 X |
| 3,481,092 | 12/1969 | Constantino | 52/536 X |
| 3,578,541 | 5/1971 | Tariel | 220/902 X |
| 3,651,521 | 3/1972 | Davas | 403/122 X |
| 3,797,190 | 3/1974 | Widdowson | 52/595 |
| 4,044,725 | 8/1977 | Miller | 403/122 X |
| 4,227,621 | 10/1980 | Jones et al. | 217/88 X |
| 4,470,236 | 9/1984 | MacDonald, Jr. | 52/539 X |

FOREIGN PATENT DOCUMENTS

| | | |
|---|---|---|
| 835240 | 2/1952 | Fed. Rep. of Germany . |
| 1873419 | 6/1963 | Fed. Rep. of Germany . |
| 1936299 | 4/1966 | Fed. Rep. of Germany . |
| 6803388 | 10/1968 | Fed. Rep. of Germany . |
| 1904628 | 8/1970 | Fed. Rep. of Germany ...... 220/901 |
| 2340708 | 4/1974 | Fed. Rep. of Germany . |
| 2349601 | 4/1975 | Fed. Rep. of Germany . |
| 2445180 | 4/1976 | Fed. Rep. of Germany ..... 52/309.9 |
| 3042644 | 7/1982 | Fed. Rep. of Germany . |
| 357539 | 11/1961 | Switzerland .......... 52/595 |
| 632576 | 10/1982 | Switzerland . |
| 961132 | 6/1964 | United Kingdom ............ 52/309.9 |

Primary Examiner—Allan N. Shoap
Attorney, Agent, or Firm—Karl F. Ross; Herbert Dubno

[57] ABSTRACT

Insulating panels or plates are formed along their opposite longitudinal edges with a cylindrically segmental projection and a cylindrically segmental groove receiving the projection, both of these formations being preferably formed as extruded polyvinyl chloride shells. The arc length of the groove is greater than 180° but less than that of the projection so that the plates can be interfitted and angularly offset to fit around a vessel, the angular adjustability allowing the plates to be accommodated to greater and lesser curvatures of the vessel.

20 Claims, 8 Drawing Figures

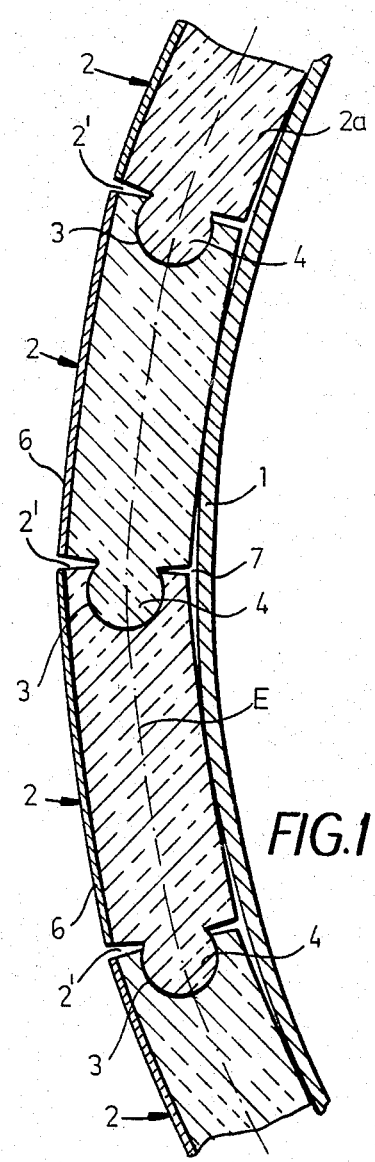
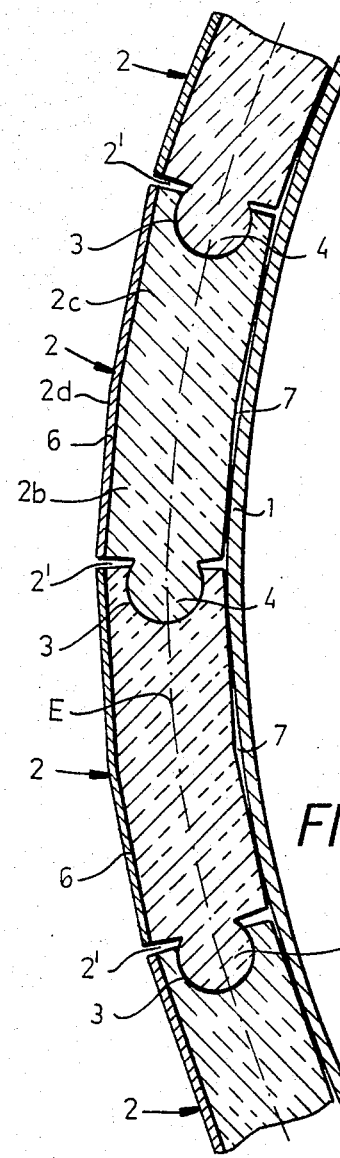
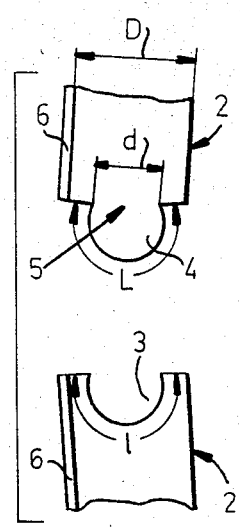
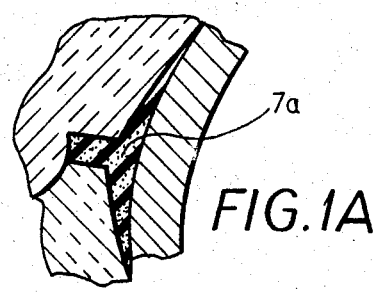
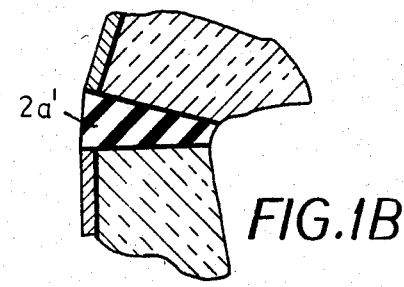

INSULATED CONTAINER AND INSULATING ELEMENT THEREFOR

FIELD OF THE INVENTION

The present invention relates to thermally insulated containers or receptacles and, more particularly, to the insulation of low-temperature receptacles, reservoirs and tanks adapted to contain, for example, low temperature liquids such as cryogenic fluids like liquified nitrogen or liquified oxygen and liquid natural gas.

BACKGROUND OF THE INVENTION

For tanks and other receptacles or reservoirs containing liquids which must be held at a substantially constant temperature or must be protected from the incursion of heat or cold or from the loss of heat and cold, it is known to provide on the vessel a layer of thermally insulating material which can be in the form of discrete thermally insulating elements which are so applied to the outer wall of the vessel as to fit closely therearound.

This has the disadvantage that the individual elements must be designed precisely for the particular vessel to which they are to be applied and hence an wide variety of different elements with various dimensions and sizes must be stocked.

OBJECTS OF THE INVENTION

It is the principal object of the present invention to provide an insulation for the purposes described whereby the disadvantage mentioned above can be obviated.

Another object of the invention is to provide an insulation for metal tanks, reservoirs or other vessels, especially for low-temperature liquid storage, which can be produced in standardized units, but nevertheless applied to vessels of different diameters or cross-sectional configurations and sizes.

It is also an object of this invention to provide an insulation for storage vessels or accumulators which can be used with vessels of different diameters and even on vessels which stand in the open, effectively and with good insulation efficiency.

Yet another object of the invention is to provide insulated storage vessels with a high degree of insulating effectiveness.

SUMMARY OF THE INVENTION

These objects and others which will become apparent hereinafter are attained, in accordance with the present invention, with an insulation for tanks, storage receptacles and other vessels, generally having a metallic outer wall, in which the insulation comprises a sheath of thermal insulating elements enclosing the vessel, the elements being elongated plates formed along opposite longitudinal edges respectively with an elongated projection and an elongated groove adapted to receive the corresponding projection of an adjacent plate, the groove and the projection having corresponding and complementary cross sections such that a plate whose projection or ridge fits into the groove of an adjacent plate can include various angles therewith, the complementary surfaces at which each projection fits into the groove comprise at least partly cylindrical surfaces so that a swivel is defined and, in cross section a succession of adjoining plates can be disposed generally along a cylindrical segment or circular arc.

Advantageously the arc length of a cross section of the groove is greater than a semicircular arc and the arc length of the cross section of the projection is still greater than that of the groove.

The plates, along their surfaces turned away from the tank or vessel, are preferably covered by a cladding layer of aluminum.

An assembly of such plates is thus readily adjusted to the curvature of a tank or other vessel since the individual segments of the insulating layer can adjoin in the manner described at their junctions between projections and grooves.

The formfit interengagement of the plates also ensures retention of one plate by the next so that an extremely stable insulating jacket if formed for the vessel.

Not only does the aluminum external layer provide an effective protective layer for the insulating material, but it also contributes to the insulating effect because of its high reflectivity and forms a vapor barrier which prevents penetration of moisture into the insulation or into the interstices between the insulation jacket and the tank.

It might be mentioned that tongue and groove slab connections are well known in various fields but that such connections have generally been intended to provide a rigid junction between platelike members. As far as this application is concerned, however, applicant is not aware of any tongue and groove connection between insulating slabs or plates which not only permits relative angular ajustment of the plates about an axis defined by the curvatures of the connection but also promotes such angular offsetting to various degrees by virtue of the shapes of the groove and the projection or tongue received therein.

Advantageously, the cross section of the plate which lies normal to the surface of the container against which the plate is applied is curved or angled to allow each plate to more closely hug the wall of the vessel and minimize the gaps between the inner surface of the plate and the outer surface of this wall.

Advantageously, these gaps are filled with a material of low thermal conductivity and some degree of yieldability, e.g. a stable synthetic material such a silicone rubber.

This, of course, further reduces the change that moisture can penetrate between the plates and the wall of the vessel.

Moisture penetration into the interior and heat leakage can be further reduced if any gaps between the plates which are accessible from the exterior are also grouted or filled, e.g. with the silicone rubber material.

The spaces between the insulating sheath and the wall of the vessel and between the plates of the insulating sheath can also be filled with a foamable material which is introduced into the interstices and permitted to foam in place. A single component foamable synthetic resin, such as a foamed polystyrene may be used here, and in addition to contributing a thermal barrier and a space-filling substance which excludes accumulation of moisture, also prevents air circulation between the outer wall of the vessel and the inner surfaces of the insulating sheath.

According to another feature of the invention, the danger that comparatively soft insulating material forming the projection of curved cross section or the groove of complementary cross section may distort or be damaged upon assembly or with time can be eliminated if the interfitting formations, i.e. the projection or tongue and the groove, are defined by hard shells which line the insulating material in these regions.

Advantageously, therefore, the surfaces of the groove and the projection can be preferably extruded prefabricated hard synthetic resin material such as polyvinyl chloride which, because the shells are preshaped, can provide a close-tolerance fit capable of withstanding substantial stress without breaking.

The insulating material can be foamed in situ to secure these profiled shells to the plates, thereby simplifying fabrication and the shells can be cemented to the aluminum foil which, as previously mentioned, covers the outer surface of the plate.

The profiled shells can have a box-like construction so that, in addition to the arcuate portions which interfit or are complementary to one another, they have flanges defining channels which can be filled with the foamed synthetic resin.

To permit especially effective its of the curved portions of the projection and of the groove, the groove may be defined in part by a projecting portion of a respective profile which can engage in a channel adjacent the head of the projecting part. The interiors of these double-wall shell cavities can be filled with foamed synthetic resin material for insulation purposes and at least the projecting part can have a flattened surface so that its diameter in the region of this flattened thickness is smaller than the diameter of the groove which thereby facilitates insertion of the projecting part into the groove and allows the projecting part to be locked in place by a relative angular displacement of the adjoining plates. This flattened portion can lie opposite an apron projecting from the shell of the projecting part adjacent the head.

Of course in all cases it is preferred that the groove and the projecting part correspond to cylindrical segments of an arc length greater than 180° in cross section.

BRIEF DESCRIPTION OF THE DRAWING

The above and other objects, features and advantages of the present invention will become more readily apparent from the following description, reference being made to the accompanying drawing in which:

FIG. 1 is a horizontal section through a portion of a vessel provided with a sheath according to the invention and where the plates encircle a vessel wall of a relatively small radius of curvature;

FIGS. 1A and 1B are detail sections showing the filling of inner and outer interstices;

FIG. 2 is a similar view of another embodiment in which the insulating plates cover a wall of larger radius of curvature;

FIG. 3 is a detail view of the connection between two plates;

SPECIFIC DESCRIPTION

Figure 6:
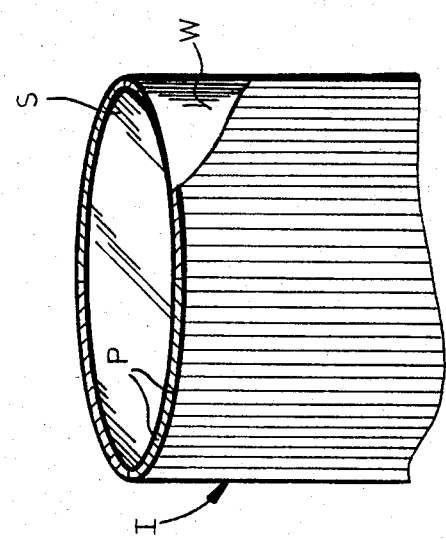
FIG. 6 is a perspective view illustrating a tank provided with an insulating sheath according to the invention.

As cam be seen from FIG. 6, this invention is applicable to all types of storage vessels especially for low-temperature fluids and represented generally at S. Such a vessel generally has a cylindrical outer wall W which may be exposed to the atmosphere and is enclosed in a sheath I of insulation which, in the present case, is formed by individual plates P of insulation. The plates are all indentical and have comparatively long lengths and short widths as illustrated, being formed on their opposite longitudinal edges with complementary projecting projections and grooves so that the projection of one plate, extending continuously over the length thereof, can fit snugly into the groove of an adjacent plate and, in addition, so that the adjacent plates can adjoin angularly or be rotated relative to one another about an axis of the respective projection so that the plates can closely hug the tank. The axes of the projections will, therefore, correspond to generatrices of an imaginary cylinder spaced outward from the wall W and will be angularly equispaced about the axis of the vessel. While a relatively large diameter tank has been illustrated in FIG. 6, the freedom of angular displacement between adjacent plates allows a lesser number of such plates to envelope a smaller diameter vessel with a considerably reduced radius of curvature, or a larger number of plates to envelope a larger-diameter vessel.

Referring now to FIGS. 1, 1A, 1B and 3, it will be apparent that the metal wall 1 of the vessel is closely hugged by the individual insulating plates 2, each of which is formed with a body 2a of thermally insulating material. This material can be foamed polystyrene.

Each of the plates 2 is formed along a longitudinal edge with a groove 3 and along the opposite longitudinal edge with a projection 4 (see also FIG. 3) with the projection 4 and the groove 3 being mutually complementary and formfittingly interengagable with the identical groove or projection of identical adjacent plates.

In cross section both of these forms are of circular arc profile, i.e. the formations are cylindrical segments which extend the full length of the respective plate, the arc length 1 of groove 3 being greater than a semicircle, i.e. greater than 180° while the arc length L of the projection is still greater than that of the groove.

The projection 4 is unitary with the rest of the plate 2 and is connected therewith by a region 5 (FIG. 3) whose thickness d is at least one-half the thickness D of the plate 2.

The cross section of the plate which is normal to the vessel axis in the embodiment of FIG. 1 is somewhat curved whereas in the embodiment of FIG. 2 it is angled, i.e. comprises two angularly adjoining sections 2b and 2c, a vertex of which is formed at 2d.

The side of each plate turned away from the vessel 1 is covered by a weather-resistant layer 6, e.g. an aluminum foil or sheet which can be bonded to the body of the plate by adhesive (not shown).

The sheath is assembled by inserting each projection 4 of a plate 2 into the groove 3 of the neighboring plate 2 around the vessel until an end groove is joined to an end projection as the sheath is completed.

An additional aluminum cover layer or foil can be provided on the inner surface of the plate to prevent any condensate formed on the outer wall of the tank as its sweats from penetrating into the insulating plates. Indeed, the foil or cover layer can extend over all of the surfaces of the insulating body including the groove and projection surfaces.

The interstices 7 between the outer wall 1 and the insulating sheath can be filled as shown in FIG. 1A with a single component foam as represented at 7a while the outer interstices 2' between the plates can be grouted with silicone rubber or another yieldable sealing material as shown at 2a' and in FIG. 1B.

Figure 4:
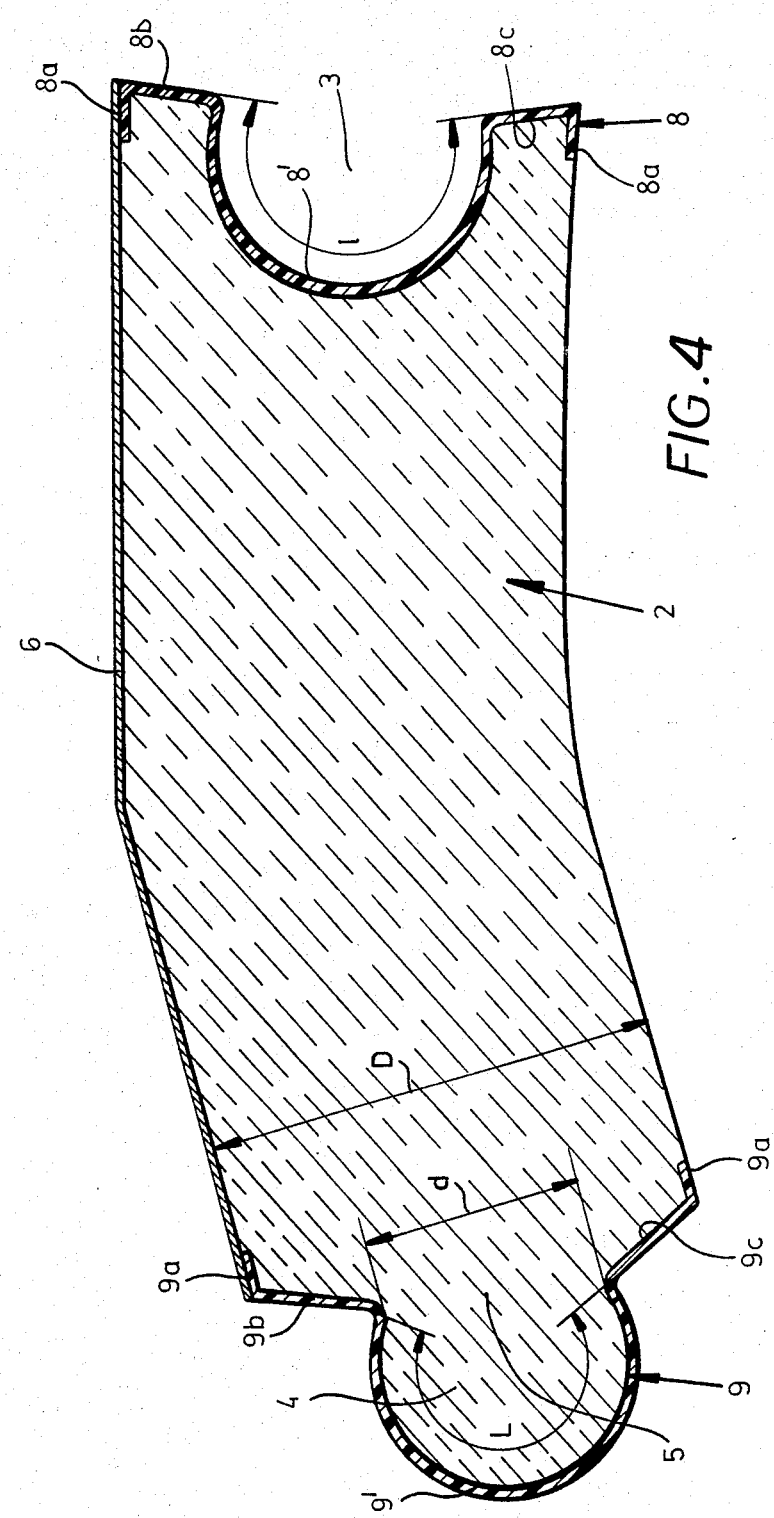
FIG. 4 is a horizontal section of another insulating plate.

From FIG. 4 it will be apparent that the groove 3 and the projection 4 can each be defined by a respective shell 8 or 9 which can be extruded from a hardenable synthetic resin such as hard polyvinyl chloride. The shells 8 and 9 can follow the curvature of the head and groove at 8' and 9', respectively, and are also formed with flanges 8a, 9a extending onto the broad surfaces of the plate and webs 8b, 9b connecting these flanges to the curved portions of the shells so that boxlike structures are formed at 8c and 9c into which the foamable material can be expanded to bond the prefabricated shells of the plates.

The shells 8 and 9, therefore, extend over the entire widths of the narrow longitudinal sides of the plates.

Figure 5:
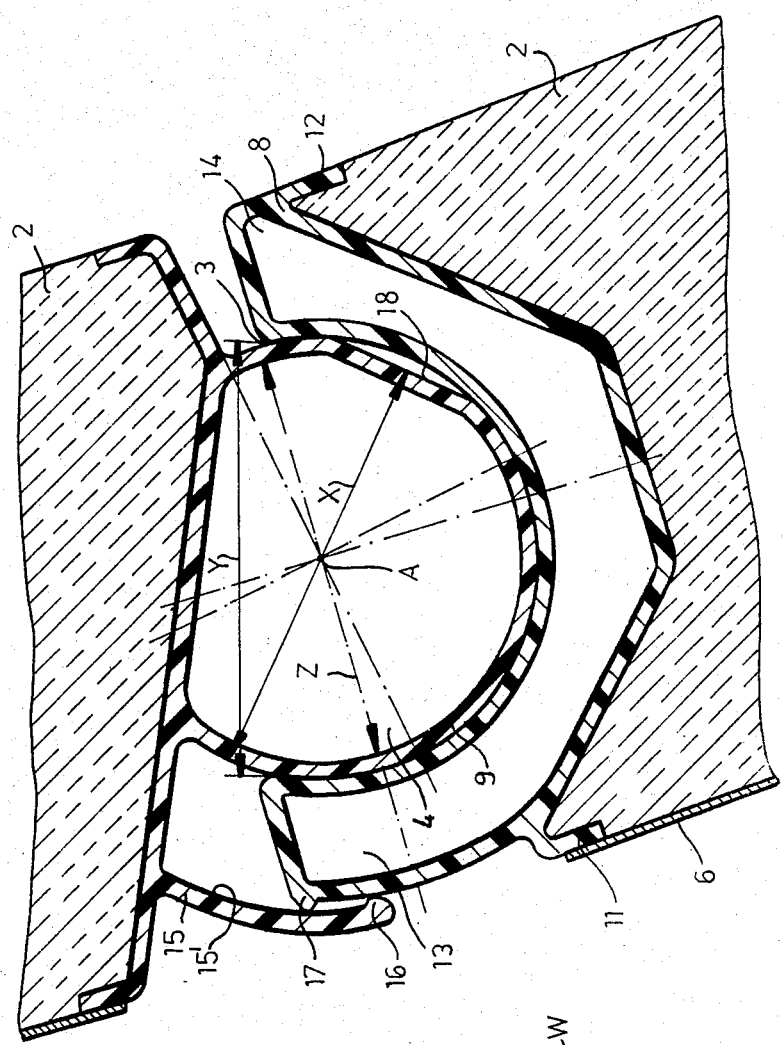
FIG. 5 is a section drawn to a greatly enlarged scale illustrating another embodiment of the junction.

In the embodiment of FIG. 5, the projection 4 is a hollow structure and the groove 3 is likewise defined as a hollow or double-wall structure. The flanges 11 and 12 correspond to the flanges 8a and 9a previously described and are flush with the inner and outer surfaces of the foamed material forming the body of the plates, the flange 11 along the outer surface being overlapped by the protective aluminum sheath 6 which can be cemented to it.

The opening of the groove 3 is canted to one side while the projection 4 may be canted to the opposite side so that on one side a comparatively long flank 13 is provided while a comparatively short flank 14 is formed on the opposite side.

A cover apron 15 spaced from the projection 4 receives the long flank 13, the spacing corresponding to the thickness of this long flank. Both the apron 15 and the long flank 13 can be provided with ribs or beads 16 and 17 which seal respectively against the flank 13 and apron 15 and which can pass each other because of the elastic of the plastic material from which the shells are formed when the projection is forced into the groove and the extension 13 into the channel 15' between the apron and the head 4.

Opposite this apron, the head 4 is provided with a flat 18 so that the outer dimension X across the projection in this region is slightly less than the width Y of the mouth of the groove 3. Apart from this flat, the diameter Z of the head can exceed the width Y.

Thus, when the dimension X lies parallel to the dimension Y, the head 4 can be readily inserted into the groove 3 and is locked in place by simply angularly offsetting the projection and the groove about the axis A of the joint. The shells can be filled with foamed material or foamable material as previously described.

I claim:

1. An insulation for a vessel having a curved outer wall and adapted to form a sheath hugging said wall, said insulation comprising a multiplicity of elongated plates having opposite longitudinal edges, each of said plates being formed with a projection along one of said edges extending the full length thereof and with a groove along the opposite edge extending the full length thereof and shaped to receive such projection, said groove and said projection being each of cylindrical segmented configuration with said groove having an arc length greater than 180° and said projection having an arc length greater than that of said groove such that more than a semicircular arc of each projection is receivable in a groove of an adjoining plate, adjoining plates being laterally retained to one another by the formfit interengagement between projection and groove and being angularly displaced relative to one another about the centers of curvature of the respective projections at varying angles corresponding to the radius of curvature of said wall to enable a sheath of said plates to closely surround said vessel, each of said plates comprising a body of foamed thermally insulating material, the interfitting grooves and projections constituting the sole means for laterally retaining the plates together into a sheath, whereby no other means is required to retain the plates together against lateral separation.

2. The insulation defined in claim 1 wherein each of said plates has a surface turned toward said wall and a surface turned away from said wall, at least that surface turned away from said wall being formed with a protective cover layer, between the respective longitudinal edges.

3. The insulation defined in claim 2 wherein said layer is composed of aluminum.

4. The insulation defined in claim 1 wherein the cross section of each plate normal to an axis of said vessel is curved to conform at least partially to the curvature to said wall.

5. The insulation defined in claim 1 wherein each body is bent at an angle so as to be concave toward said wall.

6. The insulation defined in claim 1 wherein said plates defined interstices between them at the exterior of said sheath, said interstices being filled with a sealing mass.

7. The insulation defined in claim 6 wherein said sealing mass is a silicone rubber.

8. The insulation defined in claim 1 wherein interstices within said sheath are defined by said plates and said wall, further comprising a foamed material received in said interstices.

9. The insulation defined in claim 8 wherein said foamed material is a single component foam.

10. The insulation defined in claim 1 wherein said projection and said groove of each plate are formed by respective prefabricated profiled shells, said shells being situated over the entire width of the narrow longitudinal sides of said plates.

11. The insulation defined in claim 10 wherein each of said shells is an extruded hard polyvinyl chloride shell.

12. The insulation defined in claim 10 wherein each of said plates comprises an insulating body foamed within said shells and thereby securing said shells to said insulating body the combination forming a respective plate.

13. The insulation defined in claim 12 wherein each of said shells has a boxlike profile with flanges lying along opposite faces of said body flush with the material of said body.

14. The insulation defined in claim 10 wherein said groove is defined between a relatively long flank and a relatively short flank across which a mouth of said groove is formed, said mouth of said groove being turned toward said wall.

15. The insulation defined in claim 1 wherein said projection is formed with a flat defining a width of said projection narrower than a mouth of said groove whereby said projection can be inserted in said groove and locked in said groove by angular displacement of said projection in the respective groove.

16. An insulation for a vessel having a curved outer wall and adapted to form a sheath hugging said wall, said insulation comprising a multiplicity of elongated plates having opposite longitudinal edges, each of said plates being formed with a projection along one of said edges extending the full length thereof and with a groove along the opposite edge extending the full length thereof and shaped to receive such projection, said groove and said projection being each of cylindrical segmented configuration with said groove having an arc length greater than 180° and said projection having an arc length greater than that of said groove whereby each projection is receivable in a groove of an adjoining plate and the adjoining plate can be angularly displaced relative to one another at varying angles corresponding to the radius of curvature of said wall to enable a sheath of said plates to closely surround said vessel, said projection and said groove of each plate being formed by respective prefabricated profiled shells, said groove being defined between a relatively long flank and a relatively short flank across which a mouth of said groove is formed, said mouth of said groove being turned toward said wall, each shell provided with said projection being further formed with an apron spaced from said projection but concentric therewith, the long flank of a groove receiving each projection being engaged between the platter projection and the respective apron.

17. The insulation defined in claim 16 wherein said apron lies outwardly of the respective projection with reference to said wall.

18. An insulation for a vessel having a curved outer wall and adapted to form a sheath hugging said wall, said insulation comprising a multiplicity of elongated plates having opposite longitudinal edges, each of said plates being formed with a projection along one of said edges extending the full length thereof and with a groove along the opposite edge extending the full length thereof and shaped to receive such projection, said groove and said projection being each of cylindrical segmented configuration with said groove having an arc length greater than 180° and said projection having an arc length greater than that of said groove whereby each projection is receivable in a groove of an adjoining plate and the adjoining plates can be angularly displaced relative to one another at varying angles corresponding to the radius of curvature of said wall to enable a sheath of said plates to closely surround said vessel, said projection and said groove of each plate being formed by respective prefabricated profiled shells, said groove being defined between a relatively long flank and a relatively short flank across which a mouth of said groove is formed, said mouth of said groove being turned toward said wall, each shell provided with said projection being further formed with an apron spaced from said projection but concentric therewith, the long flank of a groove receiving each projection being engaged between the latter projection and the respective apron, said apron lying outwardly of the respective projection with reference to said wall, said apron and said long flank being formed with oppositely projecting sealing ribs with the rib of said apron engaging a respective long flank and a rib of the long flank engaging the respective apron.

19. The insulation defined in claim 18 wherein said projection is formed with a flat defining a width of said projection narrower than a mouth of said groove whereby said projection can be inserted in said groove and locked in said groove by angular displacement of said projection in the respective groove.

20. The insulation defined in claim 19 wherein said flat is located opposite said apron.

* * * * *

UNITED STATES PATENT AND TRADEMARK OFFICE
CERTIFICATE OF CORRECTION

PATENT NO. : 4,640,437
DATED : 3 February 1987
INVENTOR(S) : Rudolf WEINGARTNER

It is certified that error appears in the above-identified patent and that said Letters Patent is hereby corrected as shown below:

On the Title Page:
ITEM [73] Assignee's name and address to read:

-- Greiner K.G.
   Kremsmünster, Upper Austria, Austria --.

Signed and Sealed this

Twenty-fifth Day of August, 1987

*Attest:*

DONALD J. QUIGG

*Attesting Officer*   Commissioner of Patents and Trademarks